UNITED STATES PATENT OFFICE.

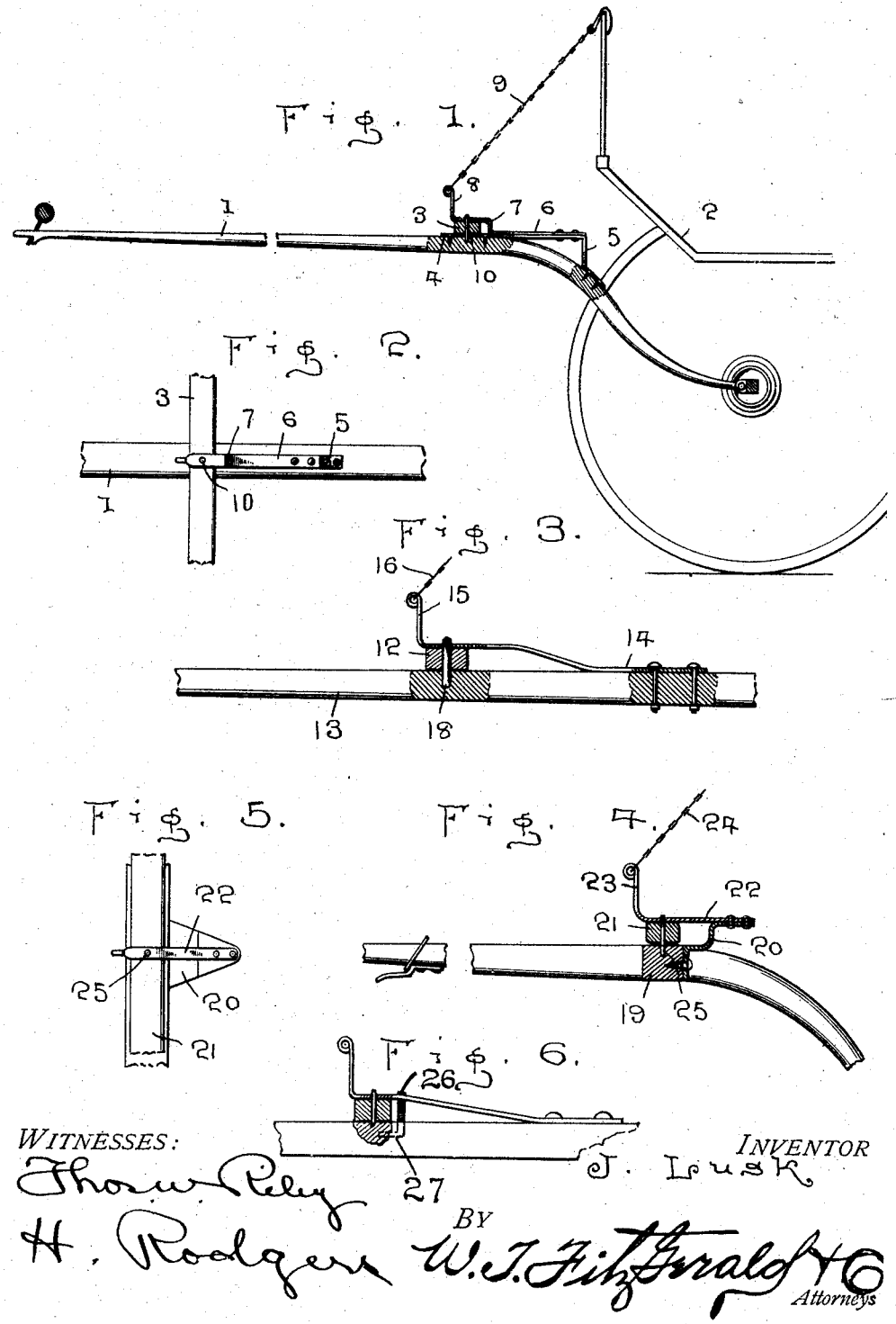

JACOB LUSK, OF AUBURNDALE, WISCONSIN.

UNHITCHING DEVICE.

No. 909,005.     Specification of Letters Patent.     Patented Jan. 5, 1909.

Application filed August 27, 1908. Serial No. 450,480.

*To all whom it may concern:*

Be it known that I, JACOB LUSK, a citizen of the United States, residing at Auburndale, in the county of Wood and State of Wisconsin, have invented certain new and useful Improvements in Unhitching Devices; and I do hereby declare the following to be a full, clear, and exact description of the invention, such as will enable others skilled in the art to which it appertains to make and use the same.

This invention relates to new and useful improvements in unhitching devices and it is an object of the invention to provide a novel device of this character whereby a horse can be quickly released from a vehicle.

Furthermore it is an object of the invention to provide a novel device of this character whereby the cross tree of the draft rigging be released for the unhitching of an animal.

It is also an object of the invention to provide a novel device of this character which will be simple in construction, efficient and advantageous in practice and comparatively inexpensive to manufacture.

With the above and other objects in view the invention consists of the details of construction and in the novel arrangement and combination of parts to be hereinafter more particularly referred to.

In describing the invention in detail, reference will be had to the accompanying drawings forming part of this specification wherein like characters of reference denote corresponding parts in the several views, and in which, Figure 1 is a view partly in elevation and partly in section illustrating the invention applied to a curved pole, Fig. 2 is a fragmentary view in top plan of the invention, Fig. 3 is a fragmentary view partly in elevation and partly in section of the invention applied to a straight pole, Fig. 4 is a fragmentary view partly in elevation and partly in section illustrating the invention applied to a draft rigging, Fig. 5 is a fragmentary view in top plan of the invention as disclosed by Fig. 4, Fig. 6 is a view similar to Fig. 3 illustrating a modified form of invention.

In the drawing 1 denotes a curved pole which is attached in any desired manner to a vehicle 2, the cross tree 3 resting on the plate 4 secured at one end to the straight portion of the pole, the opposite end portion extending over the curved portion thereof and terminating in a depending foot 5 which is suitably secured to the curved portion of the pole. Secured to the plate 4 adjacent the foot 5 thereof is an end portion of a flat spring 6, the opposite end portion of the said spring 6 being offset as at 7, in order to pass above the cross tree 3 and terminates in an upwardly standing portion 8 to which is secured one end of a flexible member 9, the opposite end of the flexible member terminating within easy reach of the occupants of the vehicle 2. The retaining pin 10 of the tree 3 passes through both the spring 6 and the tree 3 and engages the pole 1. This pin 10 is carried by the cross tree 3 and projects to either side thereof, the lower portion of the pin extending within a recess in the pole 1. If for any reason it should be desired to unhitch the animals, it is only necessary that an upward pull be given the flexible member 9, said pull raising spring 6 and thereby leaving the cross tree 3 free, as is believed to be obvious.

In Fig. 3 the cross tree 12 rests directly on a straight pole 13. To the pole 13 in rear of the tree 12 is secured an end portion of the spring 14, said spring 14 being inclined upwardly to engage the upper surface of the tree 12 and terminates in an upstanding portion 15, to which the end of the flexible connection 16 is secured. This spring 14 is adapted to act in conjunction with the pin 18, in the manner disclosed with references to the pin 10.

In Fig. 4 the invention is shown as applied to draft rigging. To the rear face of the cross bar 19 is secured the bracket 20 which projects above the cross bar 19 and terminates in approximately the same plane with the upper face of the cross tree 21. To the free portion of the bracket 20 is secured an end portion of the spring 22 which extends across the tree 21 and terminates in an upstanding portion 23, said up-standing portion having secured thereto an end of the flexible connection. The operation of this spring 22 with relation to the pin 25 is believed to be apparent.

In Fig. 6 is shown the form of invention as disclosed by Fig. 3 with the addition of a depending angular metallic strap 26, approximately U-shaped in form, the stems of the strap being adjacent the opposed sides of the pole, the free portion of each stem being bent at right angle as at 27, to project beneath the cross tree. By this arrangement it is assured that the cross tree will be disengaged from the pole, as when the spring is elevated the angular portions 27 will contact with the tree and displace the same.

I claim:—

In combination with a draft rigging having a cross tree, of a pin carried by the cross tree and having its lower end engaging the rigging, said pin projecting above the tree, a spring anchored at one end and passing over the cross tree, said pin of the tree passing through the spring, an upwardly extending terminal at the free end of the spring means engaging said upwardly extending portion for elevating the free end of the spring, and means carried by the spring for contacting with the tree when the free end of the spring is elevated.

In testimony whereof I have signed my name to this specification in the presence of two subscribing witnesses.

JACOB LUSK.

Witnesses:
 EDWIN J. HAHN,
 A. G. KOCH.